United States Patent
Kuhn et al.

(10) Patent No.: US 7,360,893 B2
(45) Date of Patent: Apr. 22, 2008

(54) SYSTEMS AND METHODS FOR SHAPING WAVEFRONTS IN POLYCHROMATIC LIGHT USING PHASE SHIFTING ELEMENTS

(75) Inventors: Tobias Kuhn, Heidelberg (DE); Ulrich von Pape, Landau (DE)

(73) Assignee: 20/10 Perfect Vision Optische Geraete GmbH, Heidelberg (DE)

( * ) Notice: Subject to any disclaimer, the term of this patent is extended or adjusted under 35 U.S.C. 154(b) by 519 days.

(21) Appl. No.: 10/930,730

(22) Filed: Aug. 31, 2004

(65) Prior Publication Data

US 2006/0061731 A1 Mar. 23, 2006

(51) Int. Cl.
*A61B 3/10* (2006.01)

(52) U.S. Cl. ..................... 351/205; 351/221

(58) Field of Classification Search ........ 351/200–221, 351/237–238, 618, 537
See application file for complete search history.

(56) References Cited

U.S. PATENT DOCUMENTS

| | | | | |
|---|---|---|---|---|
| 4,579,430 A | 4/1986 | Bille | | 351/206 |
| 5,062,702 A | 11/1991 | Bille | | 351/212 |
| 5,452,024 A | 9/1995 | Sampsell | | 348/755 |
| 5,537,252 A * | 7/1996 | Rauch | | 359/569 |
| 5,704,701 A | 1/1998 | Kavanagh et al. | | 353/33 |
| 5,777,781 A | 7/1998 | Nam et al. | | 359/291 |
| 5,949,521 A | 9/1999 | Williams et al. | | 351/205 |
| 6,002,484 A | 12/1999 | Rozema et al. | | 356/354 |
| 6,220,707 B1 * | 4/2001 | Bille | | 351/212 |
| 6,268,952 B1 * | 7/2001 | Godil et al. | | 359/291 |
| 6,428,533 B1 | 8/2002 | Bille | | 701/37 |
| 6,491,398 B2 | 12/2002 | Takeuchi et al. | | 353/31 |
| 6,717,104 B2 * | 4/2004 | Thompson et al. | | 219/121.73 |
| 6,826,330 B1 * | 11/2004 | Godil et al. | | 385/37 |
| 6,829,092 B2 * | 12/2004 | Amm et al. | | 359/573 |
| 2003/0223748 A1 * | 12/2003 | Stowe et al. | | 398/48 |

* cited by examiner

*Primary Examiner*—M. Hasan
(74) *Attorney, Agent, or Firm*—Nydegger & Associates

(57) ABSTRACT

A system for producing polychromatic light having selectively shaped wavefronts includes a source for generating light beams of at least two wavelengths ($\lambda_1$, $\lambda_2$). The beams are made up of a plurality of contiguous sub-beams that establish $\lambda_1$ and $\lambda_2$ wavefronts. From the source, the light is directed toward an optical phase shifting device which can include one or more arrays, with each array having a plurality of elements. Functionally, within a particular array, each element is independently adjustable to selectively alter the optical pathlength of a corresponding sub-beam. For light having two wavelengths ($\lambda_1$, $\lambda_2$), a first array configuration is used to reshape the $\lambda_1$ wavelength light and a second array configuration is used to reshape the $\lambda_2$ wavelength light. After wavefront reshaping, the $\lambda_1$ and $\lambda_2$ wavelength light is directed onto a common beam path where it can be viewed, imaged or further processed.

22 Claims, 3 Drawing Sheets

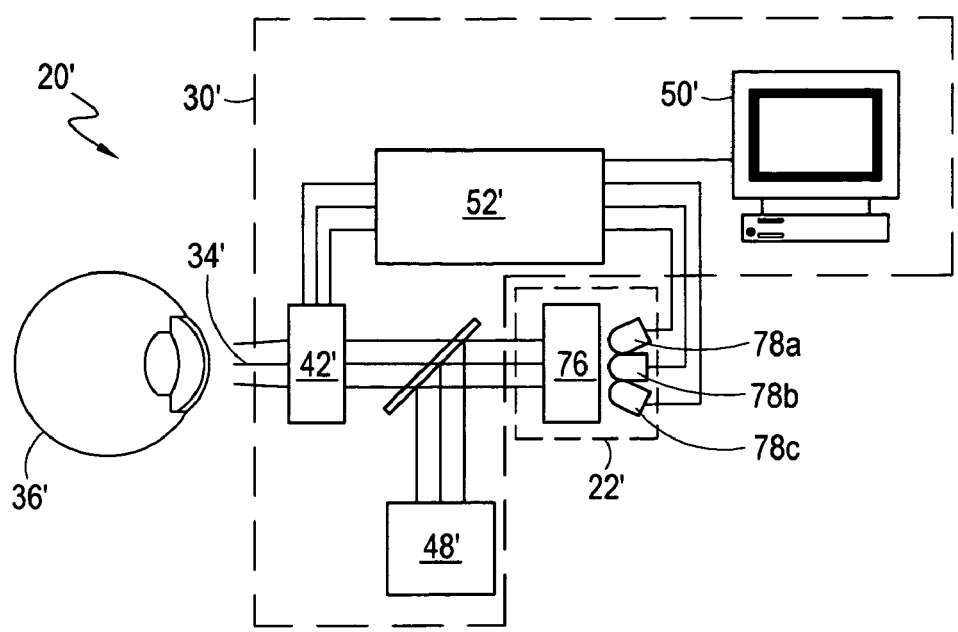
Fig. 6
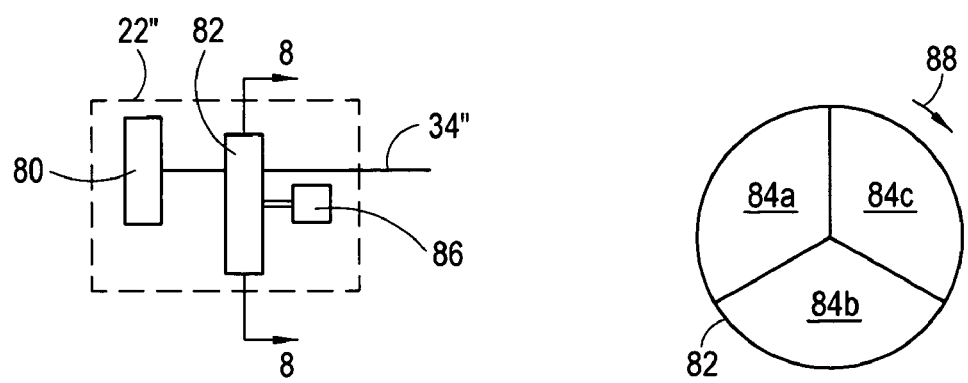
Fig. 7
Fig. 8

SYSTEMS AND METHODS FOR SHAPING WAVEFRONTS IN POLYCHROMATIC LIGHT USING PHASE SHIFTING ELEMENTS

FIELD OF THE INVENTION

The present invention pertains generally to systems and methods for wavefront shaping. More particularly, the present invention pertains to systems and methods for shaping wavefronts that can include light having several different wavelengths. The present invention is particularly, but not exclusively, useful for creating a polychromatic wavefront having a pre-selected wavefront shape.

BACKGROUND OF THE INVENTION

The term "wavefront" can be defined as an imaginary surface joining points of constant phase in a wave propagating through a medium. For light waves, a wavefront can be thought of as a three-dimensional imaginary surface of constant optical path length, orthogonal to a family of rays that emanate from a source of radiation. In terms of shape, a wavefront can be spherical, planar or arbitrarily shaped. Indeed, for a monochromatic wave propagating from a point source through a medium of constant refractive index, a spherically shaped wavefront will be emitted from the source. At large distances from the source, however, the wavefront can be considered to be approximately planar. On the other hand, imperfect optical systems, natural phenomena (e.g. atmospheric turbulence) and many other factors can lead to non-uniform, irregularly shaped wavefronts. For example, a component of an optical system, such as an imperfectly ground lens, may create an aberration which distorts an otherwise uniform (e.g. planar) wavefront.

Heretofore, insofar as monochromatic light is concerned, several types of apparatus for measuring wavefront shape have been developed. For example, methods for measuring phase deviations have been disclosed in conjunction with devices like the so-called "Hartmann-Shack sensor" and in publications such as U.S. Pat. No. 5,062,702 which issued to Bille for an invention entitled "Device for Mapping Corneal Topography." An interferometer is another, common type of apparatus that can be used to measure the shape of a wavefront.

In addition to wavefront measuring, devices and methods for wavefront reshaping have been reported. For example, U.S. Pat. No. 6,220,707 (hereinafter the '707 patent) which issued to Bille for an invention entitled "Method for Programming an Active Mirror to Mimic a Wavefront" discloses the use of a faceted mirror to reshape a wavefront. U.S. Pat. No. 6,220,707 is hereby incorporated by reference herein. Specific applications disclosed in the '707 patent include the reshaping of a distorted wavefront into a substantially planar wavefront, and vice versa. Moreover, this reshaping can be accomplished for distorted wavefronts in which the depth of the three dimensional wavefront, measured in the direction of light propagation, exceeds one wavelength.

In greater detail, the '707 patent discloses a phase-wrapping technique in which the outputs from a Hartmann-Shack wavefront analyzer are processed to determine a total deviation in phase shift for each of a plurality of contiguous sub-beams in a wavefront. These phase shifts can be measured relative to the phase of corresponding sub-beams in a reference wavefront, such as a plane wavefront. For light having a wavelength, $\lambda$, each measured "total deviation" includes a modular "$n\lambda$" (also called modular "$n2\pi$") phase shift component and a modulo "$\lambda$" (also called modulo $2\pi$) phase shift component. After measuring the total phase shift deviation, the particular modular phase shift for each sub-beam is compensated for by subtracting $n\lambda$, $(n+1)\lambda$, or $(n-1)\lambda$, etc. as appropriate, from the total phase shift of each sub-beam. Each element of the faceted mirror is then adjusted to minimize the modulo $\lambda$ phase shift deviation of each respective sub-beam to effectively transform a light beam between a distorted wavefront and a plane wavefront.

Although the above-described achievements have been successful in measuring and modifying the wavefronts of monochromatic light, many applications require the use of polychromatic light. For these applications, it may be desirable to control and modify wavefronts in a polychromatic light stream. One such application, by way of example, is the correction of aberrations created by an optical system during the imaging of a multi-colored object. Another exemplary application includes the creation of a polychromatic light stream having controlled wavefront shapes for use in testing the influence of optical aberrations on human vision.

Accordingly, in light of the above, it is an object of the present invention to provide a system and method for reshaping the wavefronts of a light stream that contains light of several different wavelengths. Another object of the present invention is to provide systems and methods for reshaping wavefronts in polychromatic light having a three dimensional wavefront depth, measured in the direction of light propagation, that exceeds one wavelength. Still another object of the present invention is to provide systems and methods for shaping polychromatic wavefronts using phase shifting elements which are simple to use, relatively easy to manufacture and comparatively cost effective.

SUMMARY OF THE INVENTION

The present invention is directed to systems and methods for actively reshaping wavefronts of an input source of light having at least two different wavelengths ($\lambda_1$, $\lambda_2$). For purposes of this disclosure, the input light can be described in terms of one or more light beams, with each beam being made up of a plurality of contiguous sub-beams. These sub-beams establish a wavefront for the $\lambda_1$ light (i.e. a $\lambda_1$ wavefront) and wavefront for the $\lambda_2$ light (i.e. a $\lambda_2$ wavefront).

The input light is received by an optical phase shifting device that can include one or more arrays, with each array having a plurality of elements. Functionally, within a particular array, each element is independently adjustable to selectively alter the optical pathlength of a corresponding sub-beam. Thus, the array can be programmed to selectively reshape a wavefront. More specifically, once programmed into a selected configuration, the array of elements operate to receive an incoming beam having a first, initial wavefront, and process the beam to create an outgoing beam having a second, modified wavefront.

For the present invention, the array of elements can be, but is not necessarily limited to, a faceted active mirror, a liquid crystal array or a foil mirror having an array of actuators that are independently operable to selectively deform the foil mirror surface. In a typical embodiment, an active mirror having approximately forty-thousand individual facets is used, with each facet being independently moveable along a respective substantially parallel path.

For source light having two wavelengths ($\lambda_1$, $\lambda_2$), a first array configuration is used to reshape the initial $\lambda_1$ wavelength waveform and a second array configuration is used to reshape the initial $\lambda_2$ wavelength waveform. As described in more detail below, for the present invention, the first and second array configurations can be accomplished using either a single array of elements or two different arrays. In either case, once the wavefronts have been reshaped, both the $\lambda_1$ wavelength light and the $\lambda_2$ wavelength light are directed onto a common beam path. Once on the common beam path, the light can be viewed, imaged or further processed.

In one particular embodiment of the present invention, the input light includes alternating pulses of the $\lambda_1$ wavelength light and the $\lambda_2$ wavelength light. For this embodiment, a single, common array of elements can be used to reshape the multi-wavelength light. Specifically, movements of the individual array elements can be synchronized with the alternating input light source to sequentially and selectively reshape the pulsed $\lambda_1$ and $\lambda_2$ wavefronts.

In another embodiment of the present invention, the input light includes the $\lambda_1$ wavelength light and the $\lambda_2$ wavelength light simultaneously. For this embodiment, the input light is split (spatially) to direct the $\lambda_1$ wavelength light onto a first beam path and direct the $\lambda_2$ wavelength light onto a second beam path. Once separated, a first array of elements is used to reshape the $\lambda_1$ wavelength wavefront and a second array of elements is used to reshape the $\lambda_2$ wavelength wavefront. After wavefront reshaping, the exit beams from the arrays are recombined onto a common beam path.

For some applications of the system, a wavefront sensor, such as a Hartmann-Shack sensor, can be provided to measure the $\lambda_1$ wavefront, the $\lambda_2$ wavefront, or both. This measurement can be performed on light propagating toward an array, light propagating away from an array, or both. The output from the sensor is then used to program the array to effectuate a selected wavefront reshaping.

In one implementation of the system, the sensor is used to measure a total deviation in phase shift for each of the sub-beams in the wavefront. These phase shifts are measured relative to the phase of corresponding individual sub-beams in a reference wavefront such as a plane wavefront. Each measured "total deviation" includes a modular "n$\lambda$" phase shift component and a modulo "$\lambda$" phase shift component, for light having a wavelength, $\lambda$.

Once the total phase shift has been determined for each sub-beam in the measured wavefront, the array of elements is divided into regions. Specifically, one region is identified with an integer "n" wherein all of the sub-beams incident on elements in the "n" region have a same modular phase shift. Next, boundary facets are detected such that all of the boundary facets have an (n+1)$\lambda$ modular phase shift, with a zero modulo $\lambda$ phase shift deviation. An "n+1" region is then identified that is adjacent the boundary facets, but outside of the "n" region. Similarly, other boundary facets may be detected which have an (n−1)$\lambda$ modular phase shift, with a zero modulo $\lambda$ phase shift deviation. If so, an "n−1" region is identified. In a like manner, "n+2" and "n+3" regions etc., as well as "n−2" and "n−3 regions etc., can be identified.

The particular modular phase shift for each region is compensated for by subtracting n$\lambda$, (n+1)$\lambda$, or (n−1)$\lambda$, etc. as appropriate, from the total phase shift of each sub-beam within the region. In this manner, the modulo $\lambda$ phase shift deviations for each sub-beam in the wavefront are determined. Thus, if the application dictates, each element can be adjusted to minimize the modulo $\lambda$ phase shift deviation of each respective sub-beam. Collectively, when this compensation is made for all elements, the active array is able to effectively transform a light beam between a distorted wavefront and a plane wavefront.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6 is a detailed, schematic view of the system shown in FIG. 5;

FIG. 7 is a front view of a light source having a filter wheel for use in the embodiment shown in FIGS. 5 and 6; and FIG. 8 is a cross sectional view of a filter wheel as seen along line 8-8 in FIG. 7.

DESCRIPTION OF THE PREFERRED EMBODIMENTS

Figure 1:
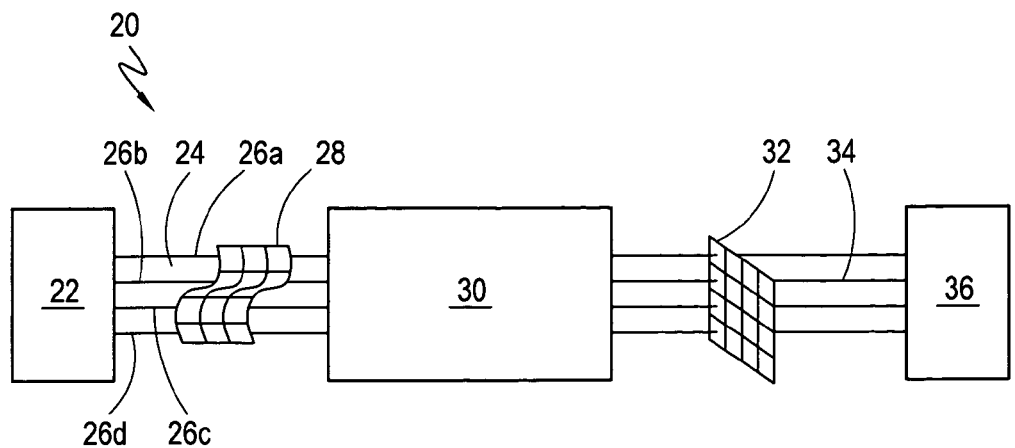
FIG. 1 is a schematic view of the primary components of a system for reshaping wavefronts in polychromatic light.

Referring to FIG. 1, a wavefront reshaping system is shown and generally designated 20. As shown in overview in FIG. 1, the system 20 includes a source 22 for generating a light beam 24 having three different wavelengths ($\lambda_1$, $\lambda_2$, $\lambda_3$). Although three wavelengths are shown and described, it is to be appreciated that light having more than three and as few as two wavelengths can be reshaped by the system 20. Moreover, the system 20 is not limited to light within the visible spectrum. FIG. 1 further illustrates that the beam 24 can be conveniently described as being made up of a plurality of contiguous sub-beams, of which exemplary sub-beams 26a-d have been shown and labeled. These sub-beams simultaneously establish initial $\lambda_1$, $\lambda_2$, $\lambda_3$ wavefronts 28 in the beam 24.

From the source 22, the light beam 24 is made incident upon an optical phase shifting device 30. For the system 20, the optical phase shifting device 30 can be programmed to independently reshape the initial $\lambda_1$, $\lambda_2$, $\lambda_3$ wavefronts 28 to produce modified $\lambda_1$, $\lambda_2$, $\lambda_3$ wavefronts 32. Once modified, the $\lambda_1$, $\lambda_2$, $\lambda_3$ wavefronts 32 exit the optical phase shifting device 30 along a common beam path 34. FIG. 1 further shows that a detector 36 can be positioned on the beam path 34 to allow the modified wavefronts 32 exiting from the device 30 to be viewed, imaged or further processed.

Figure 2:
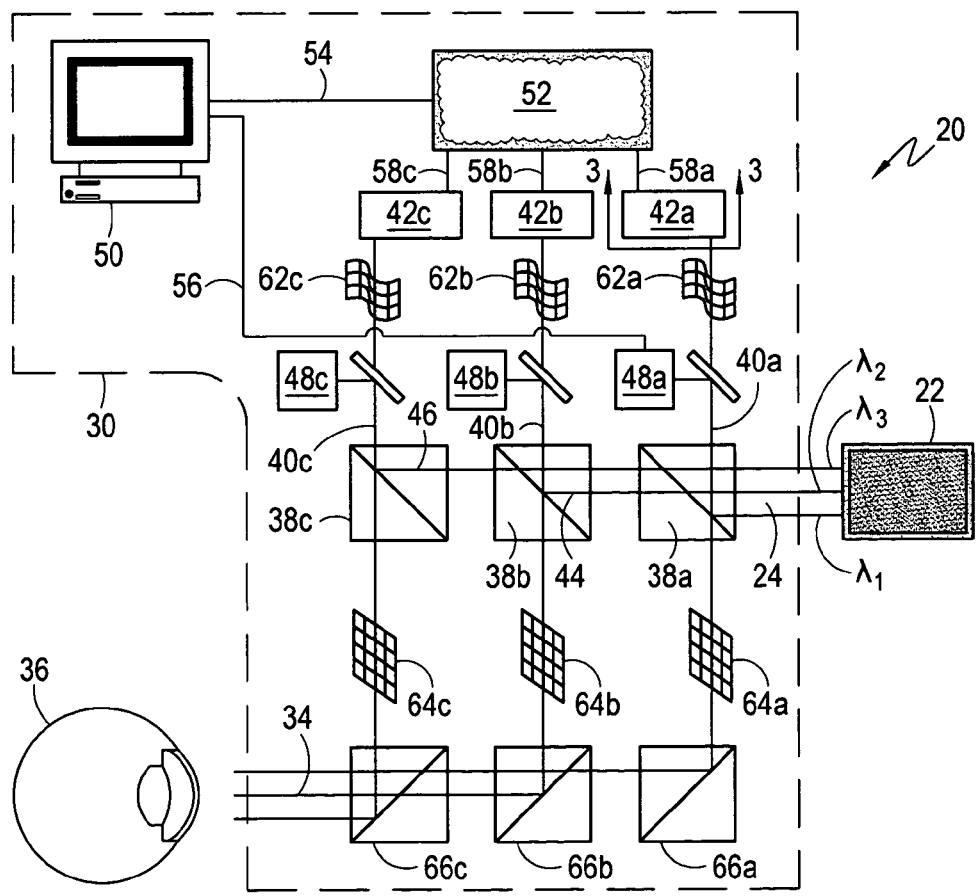
FIG. 2 is a detailed, schematic view of the system shown in FIG. 1.

FIG. 2 shows the system 20 in greater detail, including the individual components of the optical phase shifting device 30. As shown, a source 22 generates a continuous light beam 24 that simultaneously includes three different wavelengths ($\lambda_1$, $\lambda_2$, $\lambda_3$). Although different rays are used to illustrate the three different wavelengths leaving the source 22 in FIG. 2, it is to be appreciated that the entire continuous beam 24, as it leaves the source 22, includes the three different wavelengths ($\lambda_1$, $\lambda_2$, $\lambda_3$). By way of example, the source 22 can be a multicolor object that is illuminated by natural light to include white light, artificial light, or light that has been specially produced or filtered to include only the three desired wavelengths ($\lambda_1, \lambda_2, \lambda_3$). In one implementation, the three desired wavelengths ($\lambda_1, \lambda_2, \lambda_3$) correspond to a set of three primary colors. As used herein, the term 'primary colors' refers to any set of three or more colors which when added in appropriate combination will yield white. For example, $\lambda_1$ can be blue light in the wavelength range 435-480 nm, $\lambda_2$ can be red light in the wavelength range 605-750 nm, and $\lambda_3$ can be green light in the wavelength range 500-560 nm. In some applications of the system 20, light in the "traditional" RGB space (i.e. Red at 700 nm, Green at 546.1 nm and Blue at 435.8 nm) is used. For other applications, it may be preferable to use eye sensitive wavelengths. Specifically, receptors (cones) of the human eye which are responsible for color vision are most sensitive in the following wavelength regions: 550-580 nm (yellow-green), 520-540 nm (green), and 415-450 nm (blue).

FIG. 2 shows that from the source 22, the beam 24 is first incident upon splitter 38a, which directs $\lambda_1$ wavelength light onto beam path 40a and towards array 42a. As shown, the remainder of the light from splitter 38a, including light having $\lambda_2$ and $\lambda_3$ wavelengths, is directed along path 44 towards splitter 38b. At splitter 38b, light having a wavelength $\lambda_2$ is directed onto beam path 40b and towards array 42b. The remainder of the light from splitter 38b, including light having wavelength, $\lambda_3$, is directed along path 46 towards splitter 38c. At splitter 38c, light having a wavelength $\lambda_3$ is directed onto beam path 40c and towards array 42c.

It can be further seen in FIG. 2 that a portion of the $\lambda_1$ wavelength light traveling toward the array 42a on path 40a is directed to a wavefront sensor 48a. In a somewhat similar manner, a portion of the $\lambda_2$ wavelength light traveling toward the array 42b on path 40b is directed to a wavefront sensor 48b and a portion of the $\lambda_3$ wavelength light traveling toward the array 42c on path 40c is directed to a wavefront sensor 48c. Each wavefront sensor 48a-c can be, for example, a Hartmann-Shack sensor or some other suitable device known in the pertinent art for measuring a wavefront.

FIG. 2 further shows that the system 20 includes a processor 50 that is connected in electronic communication with a control unit 52 via wire 54. For the system 20, each wavefront sensor 48a-c is connected to the processor 50 via wire 56. It can further be seen that the control unit 52 is connected to each array 42a-c via wires 58a-c, respectively. With this cooperation of structure, the output from a sensor 48a-c can be used to program a respective array 42a-c to individually effectuate a selected wavefront reshaping for light on each of the respective beam paths 40a-c.

Figure 3:
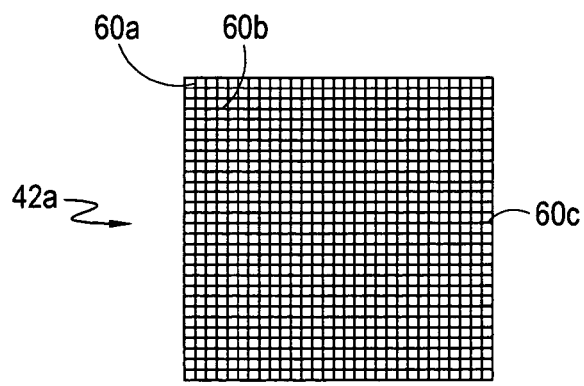
FIG. 3 is a front view of an array as seen in the direction of arrow 3-3 in FIG. 2.

In greater detail, and as best appreciated with cross-reference to FIGS. 2 and 3, each array 42a-c includes a plurality of elements 60, of which exemplary elements 60a-c have been labeled. Functionally, within a particular array 42a-c, each element 60 is independently adjustable to selectively alter the optical pathlength of a corresponding sub-beam 26 (see FIG. 1). Thus, each array 42a-c can be programmed to selectively reshape a wavefront. For the system 20, each array 42 can be, but is not necessarily limited to, a faceted active mirror, a foil mirror having an array of actuator elements that are independently operable to selectively deform the foil mirror surface, or a liquid crystal array. Thus, each array 42, depending on its particular configuration, may operate via reflection or transmission to reshape a wavefront.

In a typical embodiment, an active mirror having approximately forty-thousand individual facet elements 60 is used, with each facet element 60 being independently moveable along a respective, substantially parallel path. A more detailed description of an active, faceted mirror can be found in U.S. Pat. No. 6,220,707 which was previously incorporated by reference herein. Functionally, as shown in FIG. 2, once programmed into a selected configuration, each array 42a-c operates to receive a respective incoming beam having a first, initial wavefront 62a-c and process the beam to create a respective outgoing beam having a second, modified wavefront 64a-c. FIG. 2 shows that after reshaping, the modified wavefronts 64a-c are directed onto a common beam path 34 by respective mirrors 66a-c for receipt by a detector 36, which in this case is a human eye.

Applications of the particular embodiment shown in FIG. 2 can include, but are not limited to, enhancement of the optical quality and characteristics of binoculars, microscopes, endoscopes, and other imaging equipment. Alternatively, the system 20 shown in FIG. 2 can be used to produce polychromatic light having pre-selected wavefront characteristics. In this case, a source 22 which consists of one or more high-quality, light emitters (which can be monochromatic or polychromatic) are typically used (rather than an illuminated object). With regard to the embodiment shown in FIG. 2, it is to be appreciated that the wavefront sensors 48a-c can be selectively positioned to measure the initial wavefronts 62a-c, the modified wavefront 64a-c, or both. In all of these cases, the sensor outputs can be used to program the arrays 42a-c to obtain modified wavefronts 64a-c having pre-selected shapes. In some applications of the system 20, the shape of the source wavefronts may be known, or may be predicted or calculated. In these applications, it may not be necessary to use a wavefront measuring device (e.g. a Hartmann-Shack sensor) to modify and produce a pre-selected wavefront shape.

For the system 20, the arrays 42a-c can be used to reshape initial monochromatic wavefronts 62a-c in which the depth of the three dimensional wavefront, measured in the direction of light propagation, exceeds one wavelength. This technique for use with monochromatic light was fully described and claimed in co-owned U.S. Pat. No. 6,220,707, which was previously incorporated by reference herein. In particular, the '707 patent shows and describes a computer operation for processing the outputs of a Hartmann-Shack wavefront analyzer to determine a total deviation in phase shift for each of a plurality of contiguous sub-beams in a wavefront. In one instance, these total phase shifts can be measured relative to the phase of corresponding sub-beams in a reference wavefront, such as a plane wavefront.

Figure 4:
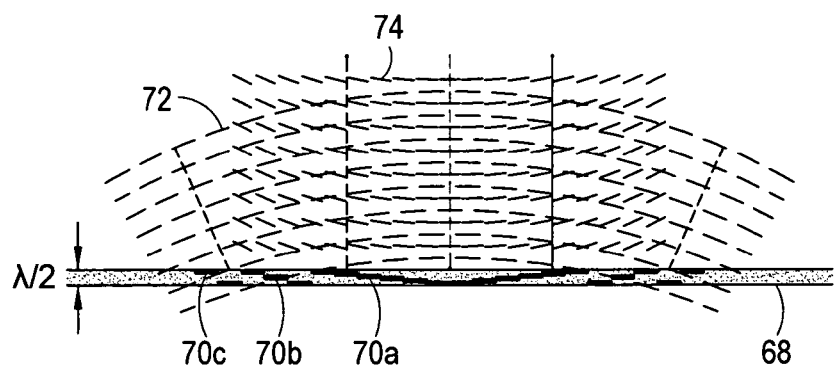
FIG. 4 is a schematic view showing the reshaping of a wavefront having a wavefront depth, measured in the direction of light propagation, that exceeds one wavelength.

FIG. 4 illustrates a phase-wrapping technique for use in conjunction with an active mirror 68 having a plurality of facets 70, of which exemplary facets 70a-c have been labeled. Specifically, FIG. 4 shows a converging monochromatic wavefront 72 having wavelength, $\lambda$, that is incident upon the facets 70 of the active mirror 68. As shown, each facet 70 is independently moveable through a distance $\lambda/2$ along a respective substantially parallel path. It can be further seen that the converging wavefront 72 has a wavefront depth, measured in the direction of light propagation, that exceeds one wavelength, $\lambda$. It can also be seen that after interaction with the facets 70 of the mirror 68, a substantially planar wavefront 74 is produced and propagates away from the active mirror 68.

To accomplish the reshaping shown in FIG. 4, a computer operates on the outputs from a Hartmann-Shack wavefront analyzer to determine a total deviation in phase shift for each of a plurality of contiguous sub-beams in a wavefront. For this purpose, the desired wavefront shape, after reshaping, can be used as a reference wavefront to measure the "total deviation." For light having a wavelength, $\lambda$, each measured "total deviation" includes a modular "$n\lambda$" phase shift component and a modulo "$\lambda$" phase shift component. After measuring the total phase shift deviation, the particular modular phase shift for each sub-beam is compensated for by subtracting $n\lambda$, $(n+1)\lambda$, or $(n-1)\lambda$, etc. as appropriate, from the total phase shift of each sub-beam. Each element of the active array can then be adjusted to minimize the modulo $\lambda$ phase shift deviation of each respective sub-beam to effectively transform a light beam, such as the converging wavefront 72 to a plane wavefront, such as the reshaped wavefront 74.

Figure 5:
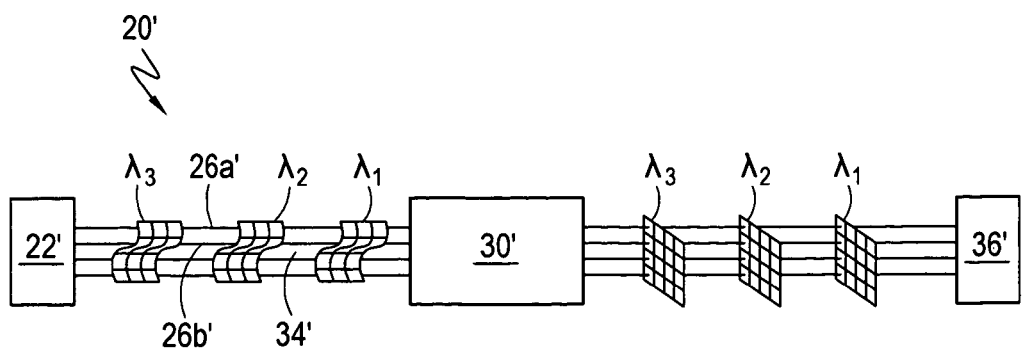
FIG. 5 is a schematic view of the primary components of another embodiment of a system for reshaping wavefronts in polychromatic light.

Referring now to FIG. 5, another embodiment of a wavefront reshaping system is shown and generally designated 20'. For the system 20', the source 22' is configured to sequentially emit pulses of light, which alternate in wavelength from pulse to pulse (e.g. $\lambda_1, \lambda_2, \lambda_3, \lambda_1, \lambda_2, \lambda_3 \ldots \lambda_1, \lambda_2, \lambda_3 \ldots$) as shown. Each pulse, for convenience, can be described as being made up of a plurality of contiguous sub-beams, of which exemplary sub-beams 26a' and 26b' have been shown and labeled. These sub-beams establish a repeating train of initial $\lambda_1, \lambda_2, \lambda_3$ wavefronts that are made incident upon an optical phase shifting device 30'.

For the system 20', the optical phase shifting device 30' is synchronized with the source 22' and can be programmed to sequentially and independently reshape the initial $\lambda_1, \lambda_2, \lambda_3$ wavefronts. As further shown in FIG. 5, the pulses exit the optical phase shifting device 30' along a common beam path 34' and have modified $\lambda_1, \lambda_2, \lambda_3$ wavefronts. FIG. 5 also shows that a detector 36' can be positioned on the beam path 34' to allow the modified wavefronts exiting from the device 30' to be viewed, imaged or further processed.

FIG. 6 shows the system 20' in greater detail, including the individual components of the source 22' and optical phase shifting device 30'. As shown, a source 22' includes an object 76 (which may or may not be multi-color) that is illuminated by three light emitters 78a-c (e.g. bulbs), with each emitter 78a-c generating a different wavelength ($\lambda_1, \lambda_2, \lambda_3$) of light. In one implementation, the three desired wavelengths ($\lambda_1, \lambda_2, \lambda_3$) correspond to a set of three primary colors. For example, $\lambda_1$ can be blue light in the wavelength range 435-480 nm, $\lambda_2$ can be red light in the wavelength range 605-750 nm, and $\lambda_3$ can be green light in the wavelength range 500-560 nm. In some applications of the system 20', light in the "traditional" RGB space (i.e. Red at 700 nm, Green at 546.1 nm and Blue at 435.8 nm) is used. For other applications, it may be preferable to use eye sensitive wavelengths. Specifically, receptors (cones) of the human eye which are responsible for color vision are most sensitive in the following wavelength regions: 550-580 nm (yellow-green), 520-540 nm (green), and 415-450 nm (blue). The intensities of the emitters 78a-c can be independently adjusted, if desired, to produce light having a pre-selected composite color. As shown, each emitter 78a-c is connected to the control unit 52' which is programmed to sequentially energize the three emitters 78a-c to produce the time varying light stream described above.

FIGS. 7 and 8 show an alternate arrangement of a source (designated source 22") for use in the system 20'. As shown, a polychromatic (e.g. white light) emitter 80 directs a beam of polychromatic light through a filter wheel 82 and onto beam path 34". The filter wheel 82 includes filters 84a-c that are azimuthally distributed as shown in FIG. 8. For the source 22", each filter 84a-c passes a respective wavelength of light, $\lambda_1, \lambda_2, \lambda_3$. A motor 86 is attached to the filter wheel 82 to rotate the filter wheel 82 in the direction of arrow 88. With this cooperation of structure, the concerted interaction of the emitter 80 and rotating filter wheel 82 produce a sequence of light pulses that alternate in wavelength ($\lambda_1, \lambda_2, \lambda_3 \ldots \lambda_1, \lambda_2, \lambda_3 \ldots$).

Referring back to FIG. 6, it can be seen that a portion of each pulse propagating away from the source 22' (or alternatively source 22") is directed to a wavefront sensor 48', which can be, for example, a Hartmann-Shack sensor or some other suitable device known in the pertinent art for measuring a wavefront. FIG. 6 further shows that the system 20' includes a processor 50' that is connected in electronic communication with a control unit 52' and the wavefront sensor 48'. It can be further seen that the control unit 52' is connected to the array 42'. The processor 50' and control unit 52' are synchronized with the alternating emitters 78a-c (or filter wheel 82 when source 20" is used). With this cooperation of structure, the output from the sensor 48' can be used to program the array 42' to sequentially effectuate a selected wavefront reshaping, pulse by pulse, for a pattern of pulses generated by the source 22' or 22". After reshaping, the modified wavefronts are directed toward a detector 36', which in this case is a human eye. For some types of detectors 36', a minimum pulse repetition rate should be maintained. For example, for viewing by the human eye, each wavelength should be pulsed at greater than fifty hertz and preferably greater than sixty hertz. For three wavelengths, the state of the array 42' would then change with a wavelength of one-hundred eighty hertz, or greater.

Applications of the particular embodiment shown in FIG. 2 can include, but are not limited to enhancement of the optical quality and characteristics of binoculars, microscopes, endoscopes, and other imaging equipment. Alternatively, the system 20 shown in FIG. 2 can be used to produce polychromatic light having pre-selected wavefront characteristics. With regard to the embodiment shown in FIG. 6, it is to be appreciated that the wavefront sensor 48' can be selectively positioned to measure a wavefront before the array 42', after the array 42', or both. In all of these cases, the sensor outputs can be used to program the arrays 42' to obtain modified wavefronts having pre-selected shapes. In some applications of the system 20', the shape of the source wavefronts may be known, or may be predicted or calculated. In these applications, it may not be necessary to use a wavefront measuring device (e.g. a Hartmann-Shack sensor) to modify and produce a pre-selected wavefront shape. Like the system 20 described above, the array 42' for the system 20' can be used to reshape initial wavefronts in which the depth of the three dimensional wavefront, measured in the direction of light propagation, exceeds one wavelength.

While the particular systems and methods for shaping wavefronts in polychromatic light as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for active wavefront shaping, said system comprising an optical phase shifting device for operating on input light having at least two wavelengths ($\lambda_1, \lambda_2$), said input light forming at least one beam, with each beam having a plurality of contiguous sub-beams, said sub-beams establishing a $\lambda_1$ wavefront and a $\lambda_2$ wavefront, said device having at least one array of elements, with each element being independently adjustable to selectively alter the optical pathlength of a respective sub-beam to sequentially effectuate a first wavefront reshaping of said $\lambda_1$ wavelength light and a second wavefront reshaping of said $\lambda_2$ wavelength light, with said first reshaping being different from said second reshaping, and wherein said device is configured to place the $\lambda_1$ wavelength light and $\lambda_2$ wavelength light on a common beam path.

2. A system as recited in claim 1 wherein $\lambda_1$ is blue light in the wavelength range 435-480 nm, $\lambda_2$ is red light in the wavelength range 605-750 nm, and said input light has light of wavelength $\lambda_3$, wherein $\lambda_3$ is green light in the wavelength range 500-560 nm.

3. A system as recited in claim 1 wherein said input light includes sequential pulses of said $\lambda_1$ wavelength light and said $\lambda_2$ wavelength light.

4. A system as recited in claim 1 wherein a said input light is a single beam of light, said beam simultaneously including $\lambda_1$ wavelength light and $\lambda_2$ wavelength light and said system includes a splitter for separating said $\lambda_1$ wavelength light from said $\lambda_2$ wavelength light.

5. A system as recited in claim 4 wherein said splitter is a filter wheel.

6. A system as recited in claim 1 wherein said optical phase shifting device has a first array of elements for reshaping said $\lambda_1$ wavelength light and a second array of elements for reshaping said $\lambda_2$ wavelength light.

7. A system as recited in claim 1 further comprising a detector positioned on the common beam path to receive the $\lambda_1$ wavelength light and $\lambda_2$ wavelength light and wherein said detector is selected from the group of detectors consisting of an eyepiece, a camera and a display.

8. A system as recited in claim 1 further comprising a wavefront sensor for measuring a $\lambda_1$ wavefront to produce a sensor output, said sensor output for use in programming said optical phase shifting device to effectuate wavefront reshaping of said $\lambda_1$ wavelength light.

9. A system as recited in claim 8 wherein said sensor is a Hartmann-Shack sensor.

10. A system as recited in claim 1 wherein said array of elements is an active mirror having a plurality of individual facets with each facet being independently moveable along a respective substantially parallel path.

11. A system as recited in claim 1 wherein said device includes a foil mirror, and said array of elements is a plurality of actuators for selectively deforming said foil mirror.

12. A system as recited in claim 1 wherein said array of elements is a liquid crystal array.

13. A system for active wavefront shaping, said system comprising:
a source for generating an input light having at least two wavelengths ($\lambda_1$, $\lambda_2$);
a splitter for temporarily separating the input light into a first light beam having a first wavelength $\lambda_1$, and a second light beam having a second wavelength $\lambda_2$, with each beam having a plurality of contiguous sub-beams, said sub-beams establishing a $\lambda_1$ wavefront and a $\lambda_2$ wavefront;
an array of elements, with each element being independently adjustable to selectively alter the optical pathlength of a respective sub-beam; and
a controller for sequentially configuring said array to reshape the $\lambda_1$ wavefront and the $\lambda_2$ wavefront.

14. A system as recited in claim 13 wherein said source emits pulses of $\lambda_1$ wavelength light at a pulse rate of greater than 50 hertz.

15. A system as recited in claim 13 wherein said splitter is a filter wheel.

16. A system for active wavefront shaping, said system comprising:
a source for generating light having a first wavelength $\lambda_1$, and a second wavelength $\lambda_2$;
a splitter for dividing said light into a first beam having $\lambda_1$ wavelength light and a second beam having $\lambda_2$ wavelength light, each said beam having a plurality of contiguous sub-beams with said sub-beams establishing a $\lambda_1$ wavefront for said first beam and a $\lambda_2$ wavefront for said second beam;
a first array of elements to reshape said first beam, each said element being independently adjustable to selectively alter the optical pathlength of a respective sub-beam in said first beam;
a second array of elements to reshape said second beam, each said element being independently adjustable to selectively alter the optical pathlength of a respective sub-beam in said second beam; and
an optical combiner for directing said reshaped $\lambda_1$ wavelength wavefront and said $\lambda_2$ wavelength wavefront onto a common exit beam path.

17. A system as recited in claim 16 wherein said first array of elements is selected from an element array consisting of an active mirror having a plurality of individual facets with each facet being independently moveable along a respective substantially parallel path, a foil mirror having a plurality of actuators for selectively deforming said foil mirror, and a liquid crystal array.

18. A method for active wavefront shaping, said method comprising the steps of:
providing an optical phase shifting device operable on input light of at least two wavelengths ($\lambda_1$, $\lambda_2$), said input light forming at least one beam of light, with each beam having a plurality of contiguous sub-beams, said sub-beams establishing a $\lambda_1$ wavefront and a $\lambda_2$ wavefront;
sequentially presenting said sub-beam with $\lambda_1$ wavefront and said sub-beam with $\lambda_2$ wavefront to the optical phase shifting device;
independently adjusting the optical phase shifting device to selectively alter the optical pathlength of a respective sub-beam for
independently reshaping said $\lambda_1$ wavefront and said $\lambda_2$ wavefront; and
combining said $\lambda_1$ wavefront and said $\lambda_2$ wavefront on a common beam path.

19. A method as recited in claim 18 further comprising the steps of:
establishing a base datum for said elements, said base datum corresponding to a plane wavefront;
measuring an individual deviation in phase shift for each of said sub-beams relative to corresponding sub-beams in said plane wavefront; and
using said measured deviations to adjust each said element to selectively shape said $\lambda_1$ wavefront and said $\lambda_2$ wavefront.

20. A method as recited in claim 19 wherein a plurality of elements establish a region and said array includes at least one said region, and wherein said method further comprises the steps of:
identifying said region with an integer "n" wherein all of the sub-beams incident on said elements in said "n" region have a respective total phase shift, said total phase shift including said individual phase shift deviation and a same modular phase shift from said plane wavefront, said modular phase shift being equal to $n\lambda_1$; and compensating for said modular phase shift during said measuring step by subtracting $n\lambda_1$ from each said total phase shift to obtain said individual phase shift deviation.

21. A method as recited in claim 20 further comprising the steps of:
   detecting boundary elements in said region wherein all said boundary facets have an $(n+1)\lambda_1$ modular phase shift with a zero individual phase shift deviation;
   identifying an "n+1" region adjacent said boundary elements and outside said "n" region wherein all of the sub-beams incident on said elements in said "n+1" region have a respective total phase shift, said total phase shift including said individual phase shift deviation and a same modular phase shift from said plane wavefront, said modular phase shift being equal to $(n+1)\lambda_1$; and
   compensating for said modular phase shift during said measuring step by subtracting $(n+1)\lambda_1$ from each said total phase shift to obtain said individual phase shift deviation.

22. A method as recited in claim 20 further comprising the steps of:
   detecting boundary elements in said region wherein all said boundary elements have an $(n-1)\lambda_1$ modular phase shift with a zero individual phase shift deviation;
   identifying an "n-1" region adjacent said boundary elements and outside said "n" region wherein all of the sub-beams incident on said elements in said "n-1" region have a respective total phase shift, said total phase shift including said individual phase shift deviation and a same modular phase shift from said plane wavefront, said modular phase shift being equal to $(n-1)\lambda_1$; and
   compensating for said modular phase shift during said measuring step by subtracting $(n-1)\lambda_1$ from each said total phase shift to obtain said individual phase shift deviation.

* * * * *